Nov. 23, 1965  J. P. GREENING  3,219,938

SIGNAL CORRELATION MEASUREMENT

Filed Sept. 15, 1961

INVENTOR.
J. P. GREENING

BY Hudson & Young

ATTORNEYS

United States Patent Office 3,219,938
Patented Nov. 23, 1965

3,219,938
SIGNAL CORRELATION MEASUREMENT
John P. Greening, Bartlesville, Okla., assignor to Phillips Petroleum Company, a corporation of Delaware
Filed Sept. 15, 1961, Ser. No. 138,500
1 Claim. (Cl. 328—133)

This invention relates to the measurement of correlation between electrical signals.

In the interpretation of seismic signals, for example, it is often desirable to measure the correlation between two or more of the signals. This procedure is useful in recognizing desired reflections in the presence of background noise. Such a measurement also provides the operator with information concerning time differences between individual signals so that appropriate corrections can be made to recognize common vibration patterns. In order to measure the correlation between electrical signals, it is common practice to multiply one of the signals by the other and integrate the resulting product. While this can be accomplished with multiplying apparatus known in the art, such apparatus is generally expensive to construct and is also plagued by a zero drift.

In accordance with the present invention, apparatus is provided for measuring the correlation between two electrical signals without actually multiplying one of the signals by the other. This is accomplished by clipping or otherwise converting the input signals to be correlated into corresponding signals having substantially square wave shapes. The resulting signals are passed to coherence measuring circuits which are adapted to provide output signals when the signals being compared are in phase with one another. There is no output signal established when the signals are out of phase with one another. These output signals can then be integrated to establish a final signal, the magnitude of which is representative of the correlation between the original signals.

Accordingly, it is an object of this invention to provide simplified apparatus for measuring the correlation between electrical signals.

Another object is to provide apparatus which is useful in interpreting seismic signals.

Other objects, advantages and features of this invention should become apparent from the following detailed description, taken in conjunction with the accompanying in which.

Figure 1:
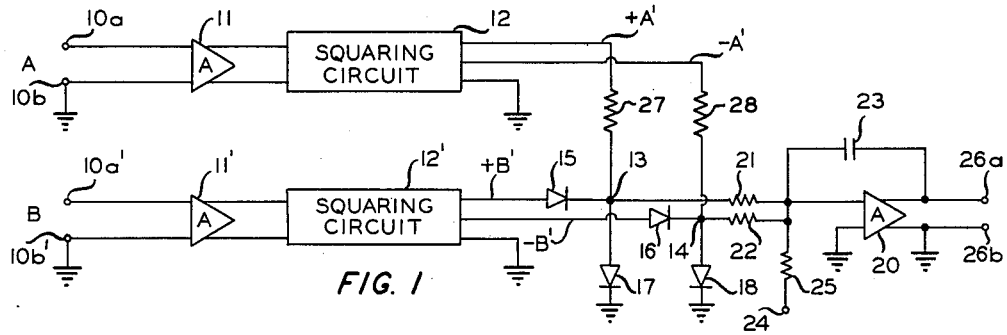
FIGURE 1 is a schematic circuit drawing of an embodiment of the correlation apparatus of this invention.
Figure 2:
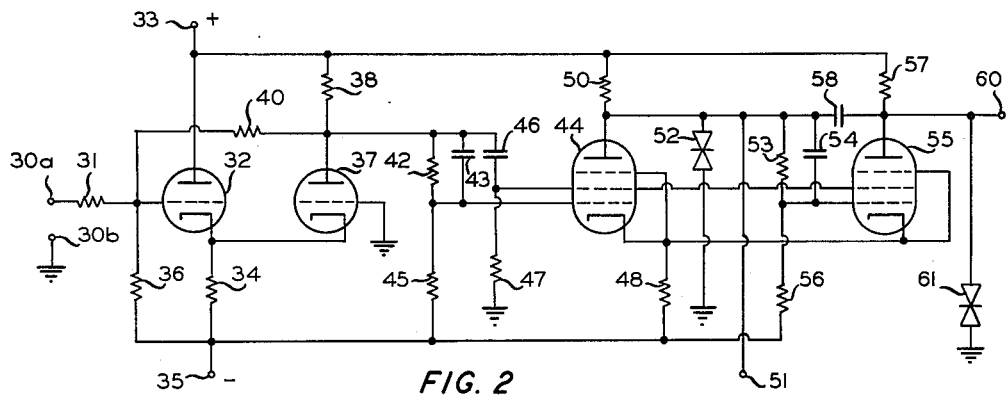
FIGURE 2 is a schematic circuit drawing of a squaring circuit which can be employed in the apparatus of FIGURE 1.

Referring now to the drawing in detail and to FIGURE 1 in particular, the illustrated apparatus is provided with a first set of input terminals 10a and 10b, the latter being grounded. These terminals are connected to the respective input terminals of an amplifier 11 which provides a signal of desired amplitude. The output terminals of amplifier 11 are connected to the respective input terminals of a first squaring circuit 12. Squaring circuit 12, which advantageously is of the type described in detail hereinafter in conjunction with FIGURE 2, provides first and second output signals which are 180° out of phase with one another and which correspond to the input signal except that they are in the form of square waves. A resistor 27 is connected between the first output terminal of squaring circuit 12 and a terminal 13, and a resistor 28 is connected between the second output terminal of squaring circuit 12 and a terminal 14. The circuit of FIGURE 1 is also provided with a second pair of input terminals 10a' and 10b' which are connected to the respective input terminals of an amplifier 11'. The output terminals of amplifier 11' are connected to the respective input terminals of a second squaring circuit 12'. The first output terminal of squaring circuit 12' is connected through a first diode rectifier 15 to terminal 13, and the second output terminal of squaring circuit 12' is connected through a second rectifier 16 to terminal 14.

Terminals 13 and 14 are connected to ground through respective diode rectifiers 17 and 18. Terminals 13 and 14 are also connected to the first input terminal of an amplifier 20 through respective resistors 21 and 22. Amplifier 20 is a conventional operational D.C. amplifier which is provided with a feedback capacitor 23 so that the amplifier operates as an integrating circuit. If desired, a bias potential can be applied to the input of amplifier 20 from a terminal 24 which is connected to the input of amplifier 20 through a resistor 25. The purpose of this bias potential is described hereinafter. Amplifier 20 is provided with respective output terminals 26a and 26b.

A suitable squaring circuit for use in FIGURE 1 is illustrated schematically in FIGURE 2. This circuit is provided with input terminals 30a and 30b, the latter being grounded. Terminal 30a is connected through a resistor 31 to the control grid of a first triode 32. The anode of triode 32 is connected to a terminal 33 which is maintained at a positive potential, and the cathode of triode 32 is connected through a resistor 34 to a terminal 35 which is maintained at a negative potential. A resistor 36 is connected between the control grid of triode 32 and terminal 35. The cathode of triode 32 is connected directly to the cathode of a second triode 37. The control grid of triode 37 is connected directly to ground, and the anode of triode 37 is connected through a resistor 38 to terminal 33. A resistor 40 is connected between the anode of triode 37 and the control grid of triode 32.

The anode of triode 37 is connected through a resistor 42, which is shunted by a capacitor 43, to the control grid of a first pentode 44. The control grid of pentode 44 is connected through a resistor 45 to terminal 35. The anode of triode 37 is also connected through a capacitor 46 to the screen grid of pentode 44, which, in turn, is connected to ground through a resistor 47. The cathode and the suppressor grid of pentode 44 are connected through a resistor 48 to terminal 35, and the anode of pentode 44 is connected through a resistor 50 to terminal 33. The anode of pentode 44 is connected to a first output terminal 51. Terminal 51 of the first squaring circuit is connected through resistor 27, and terminal 51 of the second squaring circuit is connected through diode 15, to terminal 13 of FIGURE 1, for example. A pair of Zener diodes 52 are connected between terminal 51 and ground.

The anode of triode 44 is also connected through a resistor 53, which is shunted by a capacitor 54, to the control grid of a second pentode 55. The control grid of pentode 55 is connected through a resistor 56 to terminal 35. The cathode and the suppressor grid of pentode 55 are connected through resistor 48 to terminal 35. The screen grid of pentode 55 is connected to the screen grid of pentode 44. The anode of pentode 55 is connected through a resistor 57 to terminal 33 and through a capacitor 58 to the junction between the anode of pentode 44 and resistor 53. The anode of pentode 55 is connected to a second output terminal 60. Terminal 60 of the first squaring circuit is connected through resistor 28, and terminal 60 of the second squaring circuit is connected through diode 16, to terminal 14 of FIGURE 1, for example. A pair of Zener diodes 61 are connected between terminal 60 and ground.

Triodes 32 and 37 form a first flip-flop trigger circuit. For example, a rise in potential at terminal 30a above a threshold value initiates conduction through triode 32. This increases the potential at the cathodes of triodes 32 and 37 until triode 37 is cut off. The resulting rise in potential at the anode of triode 37 is transferred as regenerative feedback to the grid of triode 32 to increase further the conduction of triode 32. When the input signal decreases in potential below a second threshold value, the above-described action is reversed. These changes in state of operation occur quite rapidly so that the output signal at the anode of triode 37 is essentially of square wave form. However, this signal may not be entirely symmetrical. Pentodes 44 and 55 form a second flip-flop trigger circuit to provide symmetrical output square wave signals. The feedback path of this pentode circuit is through the cathodes, however. The two output signals are taken from the anodes of the two pentodes and are thus 180° out of phase with one another. The Zener diodes are employed to hold the output potentials at preselected values.

The circuit of FIGURE 2 provides sharp square waves, and is, therefore, quite useful as the squaring circuits of FIGURE 1. However, other types of squaring circuits can be employed. For example, amplifier 11 can be constructed to provide two output signals 180° out of phase with one another. Two rectifiers can be connected across the output terminals of the amplifier with polarities reversed to serve as bipolar clippers. This provides signals of substantially square wave configurations.

Figure 3:
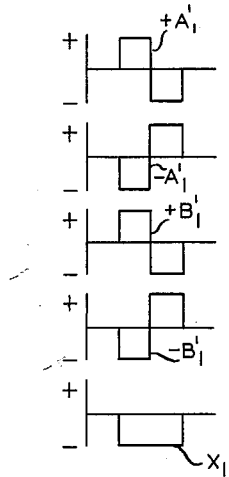
FIGURES 3, 4 and 5 are graphical representations of the operation of the correlation measuring circuit of this invention.
Figure 4:
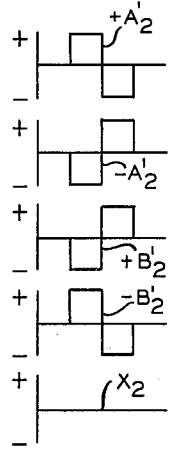
Figure 5:
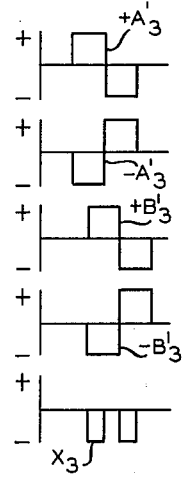

The operation of the circuit of FIGURE 1 can readily be visualized with reference to FIGURES 3, 4 and 5. It will first be assumed that the two input signals A and B to be correlated are in phase with one another. Squaring circuit 12 thus provides signals $+A'_1$ and $-A'_1$, see FIGURE 3, which are 180° out of phase with one another. In like manner, squaring circuit 12' provides output signals $+B'_1$ and $-B'_1$. All of these square wave signals have substantially equal amplitudes. During the first half-cycle, the potential of the $+A'$ lead is positive and is applied to the first end terminal of resistor 27. The potential of the $+B'$ lead is positive and is applied to the first end terminal of diode 15. Diode 17 conducts heavily, causing a voltage drop across resistor 27 and conduction through diode 15, and a zero signal on terminal 13 is applied to amplifier 20 through resistor 21. During this same half-cycle, the potential of the $-A'$ lead is negative, and is applied to the first end terminal of resistor 28. The potential of the $-B'$ lead is negative, and is applied to the first end terminal of diode 16. Under these conditions, neither of the diode rectifiers 16 or 18 conducts so that a negative potential of magnitude $-A'_1$ is applied to the input of amplifier 20 through resistor 22. This is shown as the first half of signal $X_1$ in FIGURE 3.

During the second half-cycle, the potential of the $-A'$ lead is positive, as is the potential of the $-B'$ lead. Diode 18 conducts heavily, causing a voltage drop across resistor 28 and conduction through diode 16, and a zero signal on terminal 14 is applied to amplifier 20 through resistor 22. During the same half-cycle, the $+A'$ lead acquires a negative potential, as does the $+B'$ lead of circuit 12'. Neither of the diodes 15 nor 17 conducts so that this negative potential is applied to the input of amplifier 20 through resistor 21. This constitutes the second half of signal $X_1$ in FIGURE 3. Signal $X_1$ is thus applied to amplifier 20 during the complete cycle. This is maximum correlation between the input signals.

It will be assumed that the two signals A and B to be correlated are 180° out of phase with one another (zero correlation). The output signals from circuits 12 and 12' have the configurations shown in FIGURE 4 under such conditions. During the first half-cycle, the potential of the $+A'$ lead is positive, while the potential of the $+B'$ lead is negative. Diode 17 conducts causing a voltage drop across resistor 27. There is no conduction through diode 15. Under these conditions a zero signal is applied to amplifier 20 through resistor 21. At the same time, the potential of the $-A'$ lead is negative, while the potential of the $-B'$ lead is positive. Diode 18 conducts heavily, causing diode 16 to conduct, and also causing a (negative) voltage drop across resistor 28. Under these conditions a zero signal is applied to amplifier 20 through resistor 22. The output signal continues to remain at zero during the second half-cycle of signal because the polarities with respect to the leads $+A'$, $-A'$, $+B'$, $-B'$ all reverse, maintaining terminals 13 and 14 at zero potential. It can thus be seen that the output signal to amplifier 20 remains zero, as shown by curve $X_2$ in FIGURE 4. This is the situation when the correlation between signals A and B is zero.

It will finally be assumed that input signals A and B are 90° out of phase with one another. Under this condition, the output signals from squaring circuits 12 and 12' have the configurations shown in FIGURE 5. An inspection of these curves readily shows that output pulses $X_3$ are applied to summing amplifier 20 during alternate quarter cycles of the two signals. The integrated value of signal $X_3$ thus has a value approximately half as large as the integrated value of curve $X_1$ which shows that the correlation is intermediate between a maximum and zero. The magnitude of this integrated signal thus varies as a function of the correlation between the original signals.

As previously mentioned, a bias potential can be applied to terminal 24. This is useful in interpreting the output signal of the integrator. A positive bias potential, for example, shifts the amplitude of the integrator output for 180° phase difference between signals A and B. The slope of the resulting curve of integrator output vs. phase difference between signals A and B is steeper with the bias potential and can be measured more readily.

In view of the foregoing discussion, it should be evident that an improved system is provided in accordance with this invention which permits correlation between signals to be measured without actually multiplying the signals. While the invention has been described in conjunction with a presently preferred embodiment, it obviously is not limited thereto.

What is claimed is:

Coherence measuring apparatus comprising first and second electrical signal squaring means, each having first and second output terminals which provide respective output signals, with respect to ground potential, which are 180° out of phase with one another; third and fourth terminals; a first resistor connecting the first output terminal of said first squaring means to said third terminal; a second resistor connecting the second output terminal of said first squaring means to said fourth terminal; a first diode rectifier connecting the first output terminal of said second squaring means to said third terminal to permit passage of current to said third terminal; a second diode rectifier connecting the second output terminal of said second squaring means to said fourth terminal to permit passage of current to said fourth terminal; a third diode rectifier connecting said third terminal to ground to permit passage of current to ground; a fourth diode rectifier connecting said fourth terminal to ground to permit passage of current to ground; a summing amplifier having a capacitor feedback so that the output signal from said summing amplifier represents the integral of the sum of input signals applied to said summing amplifier; and third and fourth resistors connecting said third and fourth terminals, respectively, to the input of said summing amplifier.

References Cited by the Examiner

UNITED STATES PATENTS 3,005,165  10/1961  Lenigan _____ 328—133 X
3,054,062   9/1962  Vonerburg _____ 328—133

JOHN W. HUCKERT, *Primary Examiner.*